(12) United States Patent
Celik et al.

(10) Patent No.: US 11,006,308 B2
(45) Date of Patent: May 11, 2021

(54) AUTOMATIC EVENT-BASED NETWORK MONITORING

(71) Applicant: OnePIN, Inc., Westborough, MA (US)

(72) Inventors: Feyzi Celik, Hopkinton, MA (US); Marcin Nowak, Westborough, MA (US)

(73) Assignee: OnePIN, Inc., Westborough, MA (US)

( * ) Notice: Subject to any disclaimer, the term of this patent is extended or adjusted under 35 U.S.C. 154(b) by 0 days.

(21) Appl. No.: 16/715,878

(22) Filed: Dec. 16, 2019

(65) Prior Publication Data

US 2020/0120532 A1 Apr. 16, 2020

Related U.S. Application Data

(63) Continuation of application No. 15/065,169, filed on Mar. 9, 2016, now Pat. No. 10,548,038.

(60) Provisional application No. 62/130,336, filed on Mar. 9, 2015.

(51) Int. Cl.
*H04W 24/00* (2009.01)
*H04W 24/10* (2009.01)
*H04W 4/06* (2009.01)
*H04W 4/029* (2018.01)
*H04B 17/318* (2015.01)

(52) U.S. Cl.
CPC .......... *H04W 24/10* (2013.01); *H04W 4/029* (2018.02); *H04W 4/06* (2013.01); *H04B 17/318* (2015.01)

(58) Field of Classification Search
CPC combination set(s) only.
See application file for complete search history.

(56) References Cited

U.S. PATENT DOCUMENTS

| 8,073,460 | B1 | 12/2011 | Scofield et al. |
| 8,175,921 | B1 | 5/2012 | Kopra |
| 8,249,627 | B2 | 8/2012 | Olincy |
| 8,712,371 | B2 | 4/2014 | Baker et al. |
| 8,971,860 | B1 | 3/2015 | Olincy et al. |
| 8,989,712 | B2 | 3/2015 | Ziwentker et al. |

(Continued)

FOREIGN PATENT DOCUMENTS

| WO | WO2009/023591 | 2/2009 |
| WO | WO2014/049322 | 4/2014 |

OTHER PUBLICATIONS

International Search Report and Written Opinion, dated May 1, 2015, International Application No. PCTUS2015/010860, filed Jan. 9, 2015, 17 pages.

(Continued)

*Primary Examiner* — Justin Y Lee
(74) *Attorney, Agent, or Firm* — Giordano Law LLC; David A. Giordano

(57) ABSTRACT

This disclosure provides methods, systems, services, and applications for collecting data from mobile devices connected to a mobile network. Aspects include campaign-based methods and systems as well as event-based methods and systems. Data includes mobile network data such as signal strength, call quality, network type, etc. and mobile device data such as mobile device type, charge level of the battery, etc. The disclosure also provides analytics for mobile network operators including mapping of location information and data points. Also described herein are methods and systems for verifying a credit card user's mobile device location.

7 Claims, 10 Drawing Sheets

(56) References Cited

U.S. PATENT DOCUMENTS

| | | |
|---|---|---|
| 2002/0077116 A1 | 6/2002 | Havinis et al. |
| 2002/0159387 A1 | 10/2002 | Allison et al. |
| 2004/0252816 A1 | 12/2004 | Nicolas |
| 2005/0186939 A1 | 8/2005 | Barnea et al. |
| 2005/0233733 A1 | 10/2005 | Roundtree et al. |
| 2005/0289095 A1 | 12/2005 | Ruahala P et al. |
| 2006/0128312 A1 | 6/2006 | Declerck et al. |
| 2006/0224470 A1 | 10/2006 | Garcia Ruano et al. |
| 2006/0285661 A1 | 12/2006 | Patel et al. |
| 2007/0055995 A1 | 3/2007 | Jiang |
| 2007/0106698 A1 | 5/2007 | Elliott et al. |
| 2007/0111748 A1 | 5/2007 | Risbood |
| 2007/0140168 A1 | 6/2007 | Laroia et al. |
| 2007/0281689 A1 | 12/2007 | Altman et al. |
| 2008/0090597 A1 | 4/2008 | Celik et al. |
| 2008/0132257 A1 | 6/2008 | Fok et al. |
| 2008/0318554 A1 | 12/2008 | Romppanen et al. |
| 2009/0265220 A1 | 10/2009 | Bayraktar et al. |
| 2009/0280786 A1 | 11/2009 | Ziklik |
| 2010/0100387 A1 | 4/2010 | Kuiken et al. |
| 2010/0325221 A1 | 12/2010 | Cohen et al. |
| 2011/0029380 A1 | 2/2011 | Moukas et al. |
| 2011/0039557 A1 | 2/2011 | Narasimha et al. |
| 2011/0076989 A1 | 3/2011 | Lynch |
| 2011/0131421 A1 | 6/2011 | Jogand-Coulomb et al. |
| 2011/0151838 A1 | 6/2011 | Olincy |
| 2011/0151852 A1 | 6/2011 | Olincy |
| 2011/0287746 A1 | 11/2011 | Gopinath et al. |
| 2012/0057689 A1 | 3/2012 | Martin |
| 2012/0101989 A1 | 4/2012 | Ring et al. |
| 2012/0238251 A1 | 9/2012 | Lee et al. |
| 2012/0253957 A1* | 10/2012 | Bakshi .................. H04W 64/00 705/18 |
| 2012/0315880 A1 | 12/2012 | Peitrow et al. |
| 2013/0086618 A1 | 4/2013 | Klein et al. |
| 2013/0115872 A1 | 5/2013 | Huang et al. |
| 2013/0130661 A1 | 5/2013 | Berner et al. |
| 2013/0217360 A1 | 8/2013 | Dakin et al. |
| 2013/0238706 A1 | 9/2013 | Desai |
| 2013/0290820 A1 | 10/2013 | Dhanani |
| 2014/0007214 A1 | 1/2014 | Qureshi et al. |
| 2014/0026069 A1 | 1/2014 | Dennis |
| 2014/0046844 A1* | 2/2014 | Grigg .................... G06Q 20/20 705/44 |
| 2014/0057610 A1 | 2/2014 | Olincy et al. |
| 2014/0156386 A1 | 6/2014 | Williams |
| 2014/0188612 A1 | 7/2014 | Chou et al. |
| 2014/0229238 A1 | 8/2014 | Meyer et al. |
| 2014/0257985 A1 | 9/2014 | Gibson et al. |
| 2014/0329565 A1 | 11/2014 | Mannix et al. |
| 2015/0019307 A1 | 1/2015 | Girard et al. |
| 2015/0201313 A1 | 7/2015 | Celik et al. |
| 2016/0105540 A1 | 4/2016 | Kwon et al. |
| 2016/0232531 A1* | 8/2016 | Hefetz ............... G06Q 20/3224 |
| 2017/0134976 A1 | 5/2017 | Uchino et al. |

OTHER PUBLICATIONS

International Search Report and Written Opinion, dated Jun. 3, 2016, International Application No. PCT/US2016/013112, filed Jan. 12, 2016., 15 pages.

International Search Report and Written Opinion, dated Aug. 11, 2016, International Application No. PCT/US2016/30634, filed May 4, 2016, 15 pages.

International Search Report and Written Opinion, dated Aug. 11, 2016, International Application No. PCT/US2016/30664, filed May 4, 2016, 15 pages.

International Search Report and Written Opinion, dated Aug. 12, 2016, International Application No. PCT/US2016/30612, filed May 3, 2016, 19 pages.

International Search Report and Written Opinion, dated Aug. 12, 2016, International Application No. PCT/US2016/30699, filed May 4, 2016, 15 pages.

International Search Report and Written Opinion, dated Sep. 16, 2016, International Application No. PCT/US2016/30764, filed May 4, 2016, 13 pages.

International Search Report and Written Opinion, dated Aug. 18, 2016, International Application No. PCT/US2016/30859, filed May 4, 2016, 12 pages.

International Search Report and Written Opinion, dated Jul. 25, 2016, International Application No. PCT/US2016/21540, filed Mar. 9, 2016, 17 pages.

* cited by examiner

AUTOMATIC EVENT-BASED NETWORK MONITORING

CROSS-REFERENCE TO RELATED APPLICATIONS

This application is a continuation of U.S. application Ser. No. 15/065,169, now U.S. Pat. No. 10,548,038, filed Mar. 9, 2016, which claims priority to U.S. Provisional Patent Application No. 62/130,336, filed Mar. 9, 2015. The entire contents of those applications are incorporated herein by reference.

FIELD

This application relates to mobile devices and mobile networks. Specifically, this application relates to data pertaining to mobile devices and mobile networks.

BACKGROUND

Mobile device users generally expect an always-on connection with the network, clarity in voice calls, and uninterrupted data connections. To maintain these expectations, mobile operators must build and maintain a high performance network capable of meeting the Quality of Service (QoS) demands imposed by customers. Part of meeting customer expectations and ensuring all-over network coverage and quality involves constant monitoring. Monitoring focuses on a number of different elements such as the system load (the number of subscribers utilizing specific network nodes and infrastructure at any given time) as well as determining where there are coverage gaps in both the voice and data network.

Collecting real-time data about coverage gaps is a difficult process, as the coverage can often change based on the number of subscribers utilizing a particular network node or cell tower at any given time. There is a need for automatic, real-time network data collection that can be easily viewed and parsed to make actionable decisions.

SUMMARY

This disclosure provides methods, systems, applications, and services for collecting data from mobile devices connected to a mobile network. One aspect of this disclosure provides a computer-implemented method for collecting data from a plurality of mobile devices connected to a mobile network. The method comprises simultaneously sending a communication from a server to the plurality of mobile devices connected to the mobile network, wherein the communication comprises instructions to be processed by an application on the mobile device, and wherein the communication comprises a request for one or more data points to be sent to the server; and receiving at the server the requested one or more data points from the plurality of mobile devices. In some embodiments, the communication is sent to an application installed on a plurality of mobile devices.

In some embodiments, the one or more data points are selected from the group consisting of signal strength, call quality, network type, mobile device type, and roaming indication.

In some embodiments, the one or more data points is selected from the group consisting of location information, location area code/tracking area code (LAC/TAC), cell ID, BA used, DTX used, 3G BA used, Rx Level of the serving cell, Rx level of the sub-serving cell, Rx quality of the serving cell, Rx quality of the sub-serving cell, Rx levels of adjacent towers, BCCH channel list, The Network Measurement Results, current date, time and time zone, current mobile equipment) language setting, timing advance, current access technology, current network search mode, charge state of the battery, WSID of the current I-WLAN connection, CSG ID list and corresponding HNB names of detected CSG or Hybrid cells in the Allowed CSG list or the Operator CSG list, The H(e)NB IP address, and the cause of a call disconnected.

In some embodiments, the method further comprises receiving location information from the plurality of mobile devices. In some embodiments, the location information comprises one or more of Mobile Network Codes, Mobile Country Codes, Location Area Code, and Cell IDs. In some embodiments, the method further comprises mapping the plurality of mobile devices based on the cell IDs. In further embodiments, the method further comprises mapping the one or more data points corresponding to the mapped plurality of mobile devices.

In some embodiments, the application is installed on the SIM card of the mobile device.

In some embodiments, the plurality of mobile devices share an identifying characteristic. In certain embodiments, the identifying characteristic is mobile device type.

Another aspect of this disclosure provides an automated computer-implemented method for sending to a server one or more data points from a mobile device connected to a mobile network. The method comprises retrieving at the mobile device the one or more data points when a mobile event occurs, and automatically sending to the server the one or more data points retrieved by the mobile device.

In some embodiments, the one or more data points are selected from the group consisting of signal strength, call quality, network type, mobile device type, and roaming indication.

In some embodiments, the one or more data points is selected from the group consisting of location information, location area code/tracking area code (LAC/TAC), cell ID, BA used, DTX used, 3G BA used, Rx Level of the serving cell, Rx level of the sub-serving cell, Rx quality of the serving cell, Rx quality of the sub-serving cell, Rx levels of adjacent towers, BCCH channel list, The Network Measurement Results, current date, time and time zone, current mobile equipment) language setting, timing advance, current access technology, current network search mode, charge state of the battery, WSID of the current I-WLAN connection, CSG ID list and corresponding HNB names of detected CSG or Hybrid cells in the Allowed CSG list or the Operator CSG list, The H(e)NB IP address, and the cause of a call disconnected.

In some embodiments, the mobile event is selected from the group consisting of a powercycle of the mobile device, conclusion of a phone call, a dropped call, an SMS message is sent from the mobile device, when network quality falls outside a defined value, and when the mobile device enters a specific cell site. In further embodiments, the mobile event is a defined set of occurrences or a time period.

Yet another aspect of this disclosure is directed to a method of determining a credit card subscriber's location. The method comprises receiving at a server a verification request from a credit card institution, or an entity connected to a credit card institution, wherein the verification request comprises identifying information about the credit card subscriber's mobile device, sending a communication from the server to the mobile device, wherein the communication comprises a request that the mobile device send its location information to the server, receiving at the server a communication comprising the requested location information about the mobile device; and sending the location information to the credit card institution. In some embodiments, the location information is the cell ID. In some embodiments, the method further comprises correlating or converting the cell ID to a geographic location such street address, city block, zip code, neighborhood, city, county, latitude and longitude, state, etc.

A further aspect of this disclosure provides a method of verifying a credit card transaction. The method comprises receiving at a server a verification request, wherein the verification request comprises identifying information about the credit card subscriber's mobile device and the location of the credit card transaction, sending a communication from one or more servers to the credit card subscriber's mobile device, wherein the communication comprises a request that the mobile device send its location information to the server; receiving at the server a communication comprising the mobile device's location information; determining the location of the mobile device based upon the mobile device's location information; and comparing the location of the credit card transaction to the location of the mobile device, wherein the credit card transaction is verified if the location of the credit card transaction and the location of the mobile device match.

In some embodiments, the location criterion is selected from the group consisting of street address, city block, zip code, area code, city, county, latitude and longitude, and state.

Another aspect of this disclosure provides a system for collecting data from a mobile device connected to a mobile network. The system comprises a server comprising a processor configured to execute instructions and a storage memory comprising executable code and coupled to the processor, wherein the processor executes instructions for sending, instructions for receiving, and instructions for aggregating; instructions for sending a communication to a client application installed on a mobile device, wherein the communication comprises a request that the mobile device send one or more data points; instructions for receiving a communication from a mobile device, wherein the communication comprises one or more data points; and instructions for aggregating a plurality of data points when a plurality of communications are received.

In some embodiments, the one or more data points are selected from the group consisting of signal strength, call quality, network type, mobile device type, and roaming indication.

In some embodiments, the one or more data points is selected from the group consisting of location information, location area code/tracking area code (LAC/TAC), cell ID, BA used, DTX used, 3G BA used, Rx Level of the serving cell, Rx level of the sub-serving cell, Rx quality of the serving cell, Rx quality of the sub-serving cell, Rx levels of adjacent towers, BCCH channel list, The Network Measurement Results, current date, time and time zone, current mobile equipment) language setting, timing advance, current access technology, current network search mode, charge state of the battery, WSID of the current I-WLAN connection, CSG ID list and corresponding HNB names of detected CSG or Hybrid cells in the Allowed CSG list or the Operator CSG list, The H(e)NB IP address, and the cause of a call disconnected.

In some embodiments, the system further comprises instructions for mapping the plurality of data points.

DETAILED DESCRIPTION

Figure 1:
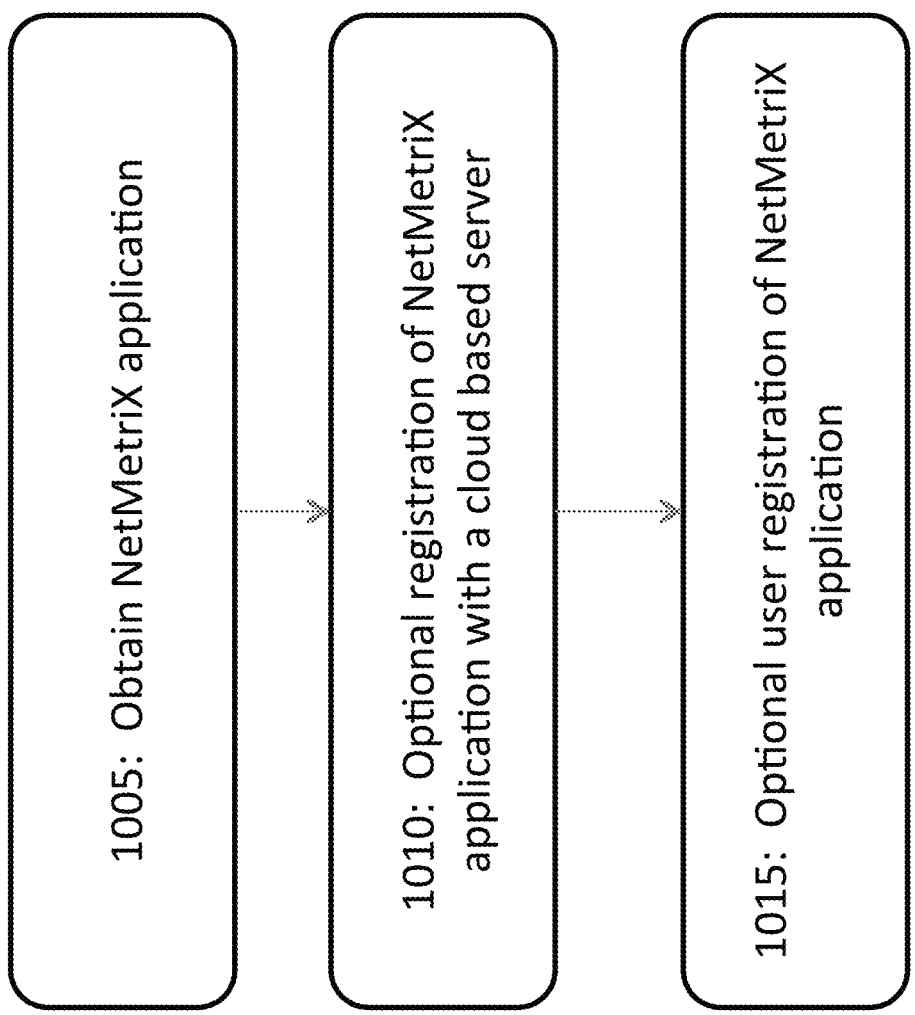
FIG. 1 is an exemplary process flow diagram illustrating a process of obtaining and initializing the NetMetriX application.

This application provides aspects and embodiments of OnePIN's automatic network monitoring service, NetMetriX™. "NetMetriX" is used throughout this application to refer to multiple aspects and embodiments of the network data collection methods, applications, services, and systems disclosed herein. The name "NetMetriX" is not limited to any specific embodiment. Furthermore, other names are also used to refer to embodiments described herein.

As used herein, the terms "a" and "an" mean one or more than one.

Aspects of the systems, methods, and services disclosed herein pertain to mobile network analytics. In some embodiments, NetMetriX refers to a mobile network analytics services, system, applications, and methods for Mobile Network Operators (MNO). The service measures, collects, and/or geographically maps items including but not limited to: network quality & coverage, call quality, roaming, call drops, battery usage, location information, and handset distribution.

In some embodiments, the service utilizes a cloud based architecture that interacts with a client application residing on a mobile device—either as a downloadable application from an external site, within the device operating system ("OS"), or within a SIM (Subscriber Identity Module) card.

In some embodiments, NetMetriX is used with a mobile phone. In some embodiments, NetMetriX is used with other devices that can be configured to use a mobile voice, SMS, or data network. For example, tablets and other computers utilizing Wi-Fi or mobile data connections can also make use of NetMetriX.

NetMetriX can collect network data and mobile subscriber device settings (such as user interface language setting and battery usage) from all devices regardless of device type, make, or model. The service is timely as it provides a real-time snapshot of the network quality experienced by subscribers at a specified time.

Exemplary real-time data points captured include:
Signal strength
Call quality
Network type Handset type Roaming indication The NetMetriX service works by allowing mobile operators to collect continuous network monitoring data using a variety of different methods based on the MNO's need. Two embodiments include a campaign-based approach and an automatic event-based approach (such as collecting data after a phone call with poor quality). Both of these are described in more detail in this application.

In a campaign-based approach, MNOs can target a pre-selected group of subscribers. A communication is generated at the server level and sent to the client application on the mobile device. Then, the client application is triggered, meaning network measurements, data points, or general user data are collected. In some embodiments, the information is stored within the client application for later retrieval. In other embodiments, the information is sent back to the server immediately or at a specific time based on the type of command sent to the application. More details describing the flows are outlined herein.

In an automatic event-based approach, network measurement results can be collected after a specific mobile event, such as after a phone call is made or after a dropped call occurs, or after a text message (also referred to as a "Short Message Service" or "SMS") is sent. These are only a subset of the various network and user-generated events that could trigger the NetMetriX service to collect available data. The event triggers the application, which automatically collects network data and/or user data. As with the campaign-based approach described above, the data can be stored within the client application for later retrieval or sent to the cloud.

Operators increase their network quality by collecting important quality measurements from the network. NetMetriX enables operators to quickly identify network quality issues (e.g., dead zones) with minimum costs. NetMetriX also enables operators to reduce the expensive need of having a number of actual live drive test vehicles that cover various routes to check signal strength in different locations. Alternatively, for mobile operators who wish to test coverage at a very granular level (e.g., at specific latitude and longitude locations), the NetMetriX service can help pinpoint locations where drive test trucks should travel in order to further test network quality and coverage. In addition, information related to mobile subscriber usage and handset setup preferences can be tracked including: user interface language selections, the current access technology, the charge state of the battery, and the current network search mode. This information is highly valuable to various groups within an MNO. Examples of such groups include: handset teams within the MNO responsible for making purchasing decisions; marketing teams responsible for drafting promotional campaigns (e.g., which subscribers should be targeted with English vs. Spanish); and engineering teams attempting to optimize the network based on the type of devices currently connected.

Basic Architecture

In one exemplary architecture, the NetMetriX service has two components:

1. A client application on the mobile device configured to run the NetMetriX service; and
2. A cloud (server) application capable of managing the NetMetriX service across multiple mobile operators.

In some embodiments, the client application is embedded in the mobile device operating system. In some embodiments, the client application is installed on the device operating system. In further embodiments, the client application is on the SIM card. The client application can have the intelligence to automatically send designated network and subscriber data to the cloud after specific events such as after a phone call or after a phone is turned on for the first time. The client application can also have the intelligence to collect network signal strength; the device type (make, model, and IMEI data); device battery usage; default user interface language selections; location information such as Mobile Network Codes, Mobile Country Codes, Location Area Code, Cell IDs, and latitude and longitude. The client application can have the intelligence to communicate with the server via a network connection.

In some embodiments, the cloud and client application have the intelligence to alert subscribers via a user interface that network information is being collected. In some embodiments, the number of times the alert is shown to the mobile subscriber, and the event after which the subscriber sees the alert (such as upon handset start-up, immediately prior to network measurement data being sent, after a phone call, etc.) are configurable both within the client application and within the server. These configurable items can be managed by the server and can be changed within the application via remote updates at any time. The alerts could be used in scenarios where government regulations dictate that certain subscriber information cannot be collected without a subscriber's knowledge or consent.

In some embodiments, the NetMetriX service has the intelligence to ask the mobile subscriber if he or she would like to terminate usage and participation, meaning network measurement data would no longer be sent automatically from the mobile device or in the event that the subscriber is part of a targeted campaign. This intelligence resides either within the cloud server or within the client application.

In some embodiments, the cloud server has the intelligence to communicate with the client application. In some embodiments, the cloud server collects the device type of the respective mobile devices and sends a message to the respective client applications to "turn off" the NetMetriX client application in mobile devices that have known issues and/or bugs that interfere with the service. The cloud server can have the intelligence to receive messages from the client application.

Application Initialization

An exemplary process of obtaining and initializing the NetMetriX application is shown in the FIG. 1, which pertains to service initialization and registration. At stage 1005, the NetMetriX application is obtained by a mobile subscriber. For example, the NetMetriX service is implemented as i) a single individual application that is downloaded and installed on a mobile device (e.g., from an app store), ii) the NetMetriX application can be part of and/or installed on a SIM card in the mobile device (for devices that use SIM cards), and/or iii) the NetMetriX application can be installed in the mobile device by the manufacturer of the device. Alternatively, instead of the NetMetriX application being installed on a mobile device, communications can be generated from the cloud platform and transmitted to a mobile subscriber via a USSD channel. In this instance, a separate client application either on the SIM card or on the mobile device is not required.

Referring to stage 1010, some embodiments of the NetMetriX application employ a partial-cloud-based architecture. In these embodiments, the NetMetriX application on the subscriber's device interacts with a cloud-based portion of the architecture as described in more detail in subsequent paragraphs. Notably, a cloud-based architecture is not required and the NetMetriX application installed on a subscriber's device can be a self-contained application that includes some or all of the functionalities for the NetMetriX service.

In certain embodiments, when a subscriber first installs the NetMetriX application (e.g., via a download), or when a subscriber buys a new card from the mobile operator with the pre-embedded NetMetriX application, and turns on his or her handset, the application will send a registration message to a cloud server. The cloud server can check the device and determine if it should be blacklisted based on known handset bugs or other limitations (e.g., if a particular handset has a technical limitation that prevents the application from working correctly), or if the subscriber needs any special settings based on communications with the mobile operator. These settings are then sent back to the NetMetriX application on the mobile device from the cloud. This registration can occur at handset start-up, after a phone event such as making a phone call or sending an SMS, and/or at other user-configurable or operator-configurable times. These registration events can also be set within the cloud by a third party service administrator. In the case where the application is on the SIM card, the registration can occur when the subscriber purchases a new SIM card and places it in his mobile device for the first time. In this example, registration can occur either at handset start-up, or after a phone call is made or received, or after an SMS is sent, as an example.

In some embodiments, the NetMetriX application remains silent on a mobile subscriber's phone, and does not require a registration process. In the event that a mobile operator wishes to enact a registration process (per a country's legal regulation requirements, or per the mobile operator's standard operating procedures), then the service supports this need. In such an embodiment, at stage 1015, the NetMetriX application can automatically prompt the subscriber to opt-in (e.g., "Select OK to send network measurement results to MobileCo. Participating helps ensure you have the best coverage wherever you use service. See www.mobileco.com/netmetrix for additional terms and conditions." or something similar). The subscriber's response can be sent to the platform and recorded as future record of a willing opt-in. The prompt to opt-in to the service can occur at handset start-up, via a menu selection if the subscriber selects the service via a menu item (including via a SIM Toolkit menu item), upon application launch (in the scenario where the application is on the mobile device), and/or after a phone call. In the standard embodiment, rather than asking the subscriber if he wants to opt-in, the default can be to register the subscriber and then require the user to opt-out if he or she does not want to participate in the service.

The above embodiments can also be implemented in a manner where a client application (either on the phone or on the SIM card) is not required. In this instance, a USSD (Unstructured Supplementary Service Data) channel is opened and the communications between the mobile subscriber and the NetMetriX platform occur via USSD communications.

Application Menu

In some embodiments, the NetMetriX client application resides within a device OS or on a SIM card and remains invisible to the subscriber. Alternatively, the client application resides within the device operating system ("OS"), on a SIM card, or can be a downloadable application that resides on top of an application management domain and can have the intelligence to present a user interface to the mobile subscriber. In some embodiments, the user interface contains information about the service, privacy notifications, and legal requirements. In certain embodiments, the subscriber has the option to disable the service via the interface. In this case, a message is sent from the client application to the cloud indicating the subscriber's preference that he or she does not want to participate in any future data gathering efforts via the service. This notification could contain a subscriber's phone number (MSISDN), device type, and other information as a one-time data collection effort.

Collecting and Parsing Measurement Results

Two specific methods of this disclosure include a campaign-based approach and an automatic event-based approach (such as collecting data after a phone call with poor quality). In embodiments of a campaign-based data collection approach, a group of mobile subscribers are identified and targeted with a specially formatted message, containing an APDU (application protocol data unit) command. In an embodiment where the application is located on the SIM card, the command triggers the Provide Local Info SIM Toolkit Commands with qualifiers asking for network quality data. These commands and qualifiers are defined by the GSM and 3GPP standards bodies.

The targeted group of subscribers could be identified based on numerous different criteria including, but not limited to, phone numbers (MSISDN), location, the length of time of service, device type, service package type, etc. In some embodiments, MNOs can arrange intelligent campaigns, or request that intelligent campaigns be arranged, to run during predefined dates and times, for selected groups of subscribers in a regional area based on the subscriber's area code and/or based on other location information. In some embodiments, instead of depending on the applet to prepare and initialize Proactive Commands (commands from the SIM card to the mobile device) responsible for NetMetriX data measurements, the commands can be prepared for execution outside of the applet. The external entity (server) prepares the command (type, qualifier, device identifier, contents) and sends the request to the applet, the applet assembles the command based on the information for the server, sends the command to the handset, collects the data, and sends the data back to the external entity. The applet is able to understand requests from the server, execute the command, and send the data back to the server. The communication between external entity and the applet can be implemented via SMS, USSD or TCP/IP. NetMetriX applet does not need to define all possible commands types to be executed, it only has to implement a generic functionality to process command requests.

Collected network data points are sent from the application to a "cloud" server. In one embodiment, the information could be packaged in a binary SMS prepared by the NetMetriX client application, and sent back to the cloud. The data points collected include:

Location information: The mobile country code (MCC) and/or mobile network code (MNC);
Location area code/tracking area code (LAC/TAC) and cell ID of the current serving cell;
BA used (BA refers to the "Broadcast Control Channel Allocation." The value of the BA-IND field of the neighbor cells description information element or elements defining the BCCH allocation used for the coding of BCCH-FREQ-NCELL fields.)
DTX ("Discontinuous transmission") used (e.g., yes or no)
3G BA used
Rx Level of the serving cell
Rx Level of the sub-serving cell
Rx quality of the serving cell Rx quality of the sub-serving cell Rx levels and quality of adjacent towers, as defined by GSM 11.14 standards specifications The list of location information for surrounding macro cells BCCH channel list Current date, time and time zone Current ME (Mobile Equipment) language setting The Timing Advance, suitable only for GERAN Current access technology Current network search mode Charge state of the battery WSID of the current I-WLAN connection CSG ID list and corresponding HNB names of detected CSG or Hybrid cells in the Allowed CSG list or the Operator CSG list The H(e)NB IP address The cause of a call disconnected. For example, the cause of a call disconnected could be "switching equipment congestion," "temporary failure," or "no circuit/channel available."Additional explanations of a call disconnected are described in the TS 04.08 standards.

In some embodiments, network quality data is collected using an event-based approach. In some embodiments, the data is call quality data. In some embodiments, when a subscriber experiences poor network coverage and call quality during a phone call, the NetMetriX service is triggered. In some embodiments, poor call quality is defined as BER (Bit Error Rate) of 5% or higher, although this value can be configurable within the application and can be changed or updated at any time with a remote update from the cloud server. The NetMetriX client application checks the call quality level during the call (between Call Connected and Call Disconnected Events) and compares it to the configurable limit defined within the NetMetriX application. If the reported call quality of the serving cell matches or is below the configurable value or does not fall within an acceptable range, the NetMetriX application collects certain network data via the Provide Local Info commands. This information is sent back to the cloud. Information could be sent via a secure or unsecure data channel, SMS, MMS, TCP/IP, USSD, or other similar communication manner.

In another embodiment, information could be sent to the cloud when a mobile subscriber enters a specific cell site, as indicated by the LAC and other cell ID information. Again, the target cell sites could be configurable within the client application, and could be updated or changed via communication with the server at any time. When a subscriber is within a preconfigured target cell tower range, the client application can automatically send the network information to the server. Alternatively, the client application could be set to only send information after a dropped call or low coverage event AND only when the subscriber enters a targeted cell site. As a person of ordinary skill in the art would recognize, there are multiple combinations of configurable variables that can trigger the data collection.

In some embodiments, network information is sent automatically whenever a subscriber power cycles his mobile device. The client application detects the powercycle, and can issue a Provide Local Information request to the mobile device with a qualifier set to Network Measurement Results. These requests can be separate command requests from the client application specifying different information that should be returned from the handset to the application. Alternatively, the communication between the client application and device can be handled via a single generic command request.

In some embodiments, network results are sent to the server after a predefined set of occurrences or a defined time period—such as after every $10^{th}$ outgoing call made, or after every 100 SMS messages sent, or once a week/month, etc.

In an embodiment where the application is a downloadable app, NetMetriX could automatically send the available network and subscriber data the first time the application is able to communicate with the server. In an embodiment where the application is located on the SIM card, the logic can be implemented in such a way where the network results are sent to the server when the application first provisions—for example during the first time the application is able to register with the server. The provisioning and sending of NetMetriX data can be automatic.

In another embodiment, the NetMetriX service can be used to enable a location based check via a mobile subscription to validate a credit or debit card transaction, or other payment transaction. For example, an individual could visit a grocery store, and pay for all items with a credit card. When the credit card transaction occurs, the credit card institution sends an authentication location request to the NetMetriX platform. In one embodiment, this could be sent via a web service or automatically via an application programming interface (API). The NetMetriX platform would then automatically send a location request to the mobile number. This request could be sent to a NetMetriX application embedded within the mobile OS, to an application that the mobile subscriber has downloaded to his device, or to an application that resides on the subscriber's SIM card. In the embodiment where the request is sent to an application residing on the SIM card, the request can be sent as a binary class 2 SMS which is delivered directly to the application on the SIM, and not seen by the mobile subscriber. The application then requests location information from the network, or can provide the latest queued information available within the applet, based on the type of request sent from the platform. The location information (such as cell ID) is sent back to the NetMetriX platform. A lookup algorithm can be employed to match the location information, such as longitude and latitude coordinates or cell tower IDs to the physical location of the credit card transaction (such as the physical location address or longitude and latitude coordinates of the store). Once the check is completed either via the NetMetriX platform or via a link with the credit institution, authentication is granted—indicating that no holds or alerts are passed to the credit institution. In the event that the location information does not match, a "No Match" notification ("Location Authentication Not Granted") is passed back to the credit institution. The card provider can then determine the appropriate course of action such as calling or alerting the cardholder, placing a hold on the card, or logging the mismatch for further analysis.

In any of the above embodiments, the client application can send any range of available data. The application can be set to send only a predetermined subset of the available data, or could be set to send all data available from the network and device at the time of measurement. In some embodiments, the data is stored, parsed, and sorted by the cloud such that it can be summarized in reports and displayed in a graphical manner to show quality and coverage issues.

Enhanced Data Collection

Redundant Data Collection. To avoid erroneous data collection caused by anomalies, the NetMetriX client application can have the intelligence to take multiple readings (gathering network data more than once) after a triggering event. In some embodiments, network data can be collected at the beginning of a call, and again after the call has been completed. In other embodiments, the network data could be collected once, and then again after several status events have been issued by the SIM card, or could be collected a second time based on a triggering event sent from the server at a preset interval.

Data Atomicity. In some embodiments, the application returns the location information of the subscriber to the server along with the network results for each data collection event. In some embodiments, Location Information is collected two times: before the measurements are taken and after measurements are taken. If the initial and final location information of the data set do not match, the server has the intelligence to ignore the entries. In this way, the data integrity is maintained and the statistics are more reliable. In other embodiments, the data from different locations can be mapped.

Proximity to Tower. In some embodiments, the client application is able to measure and determine the mobile subscriber's proximity to a cell tower. This means that the service can determine if a subscriber is close to the tower when the network measurement was taken, or at the fringe of the cell coverage when the measurement data point was captured. Subscribers further from the tower may have a lower reported signal strength. Knowing where within the cell site a particular measurement was taken can be very valuable for Rf engineers who are optimizing the network. This value (distance from the tower) can be reported with the other network data collected, and can help the administrator determine if particular data should not be considered in an overall evaluation. The cloud platform allows administrators to exclude subscriber data that was collected where subscribers were located far from the network tower at the time of measurement. This can be determined based on a set number of feet, meters, or miles for any set of towers. Given the range in cell sizes, the fringe can be defined by the administrator at the platform level for an individual cell site, or a group of cells.

Roaming. In some embodiments, the service has the intelligence to recognize when a mobile user is roaming, and can optionally not send any network measurement results. This implementation ensures that mobile subscribers are not charged for messages that may be sent while they are roaming either out of the country, or out of their predetermined network zone as defined by a rate plan by the mobile operator. In one embodiment, the NetMetriX application can detect when a mobile subscriber is roaming, and can store network data collected. The results can be automatically sent to the server as soon as the app is able to detect that the subscriber is no longer roaming, or could be sent after a predetermined event (such as the first phone call after a subscriber is no longer roaming). In some embodiments, the roaming logic is controlled and managed remotely from the server. This includes whether or not the application will collect results from the network while roaming, whether or not the client application will store the results, and which events would trigger sending the collected data to the cloud server. In the implementation when the client application resides on the SIM card, the SIM can have the logic. In some embodiments, the SIM Toolkit event LOCATION_STATUS triggers each time a subscriber's location changes. This event can be used to detect the roaming status of the subscriber.

Mapping the Network. In some embodiments, the service has the intelligence to collect data about neighboring cells and forward this data to the server. Each time the subscriber location changes, the service collects the information about the MNC, MCC, LAC and cell ID. The server can send a request to the client to report the next N locations back to the server. N can be any integer that would be a useful number of locations. In some embodiments, N is an integer from 1 to 100. In certain embodiments, N is an integer from 1 to 30. In other embodiments, N is an integer from 1 to 30. In the implementation when the client application resides on the SIM card, the SIM Toolkit event LOCATION_STATUS triggers N number of times the subscriber's location changes and sends the location information about the last N changes back to the server. If the physical locations of the cell IDs are unknown, the neighboring cell information allows the server to represent the mobile network (and the results) in a form of graph without a need for longitude of latitude of each of the individual cells.

Figure 2:
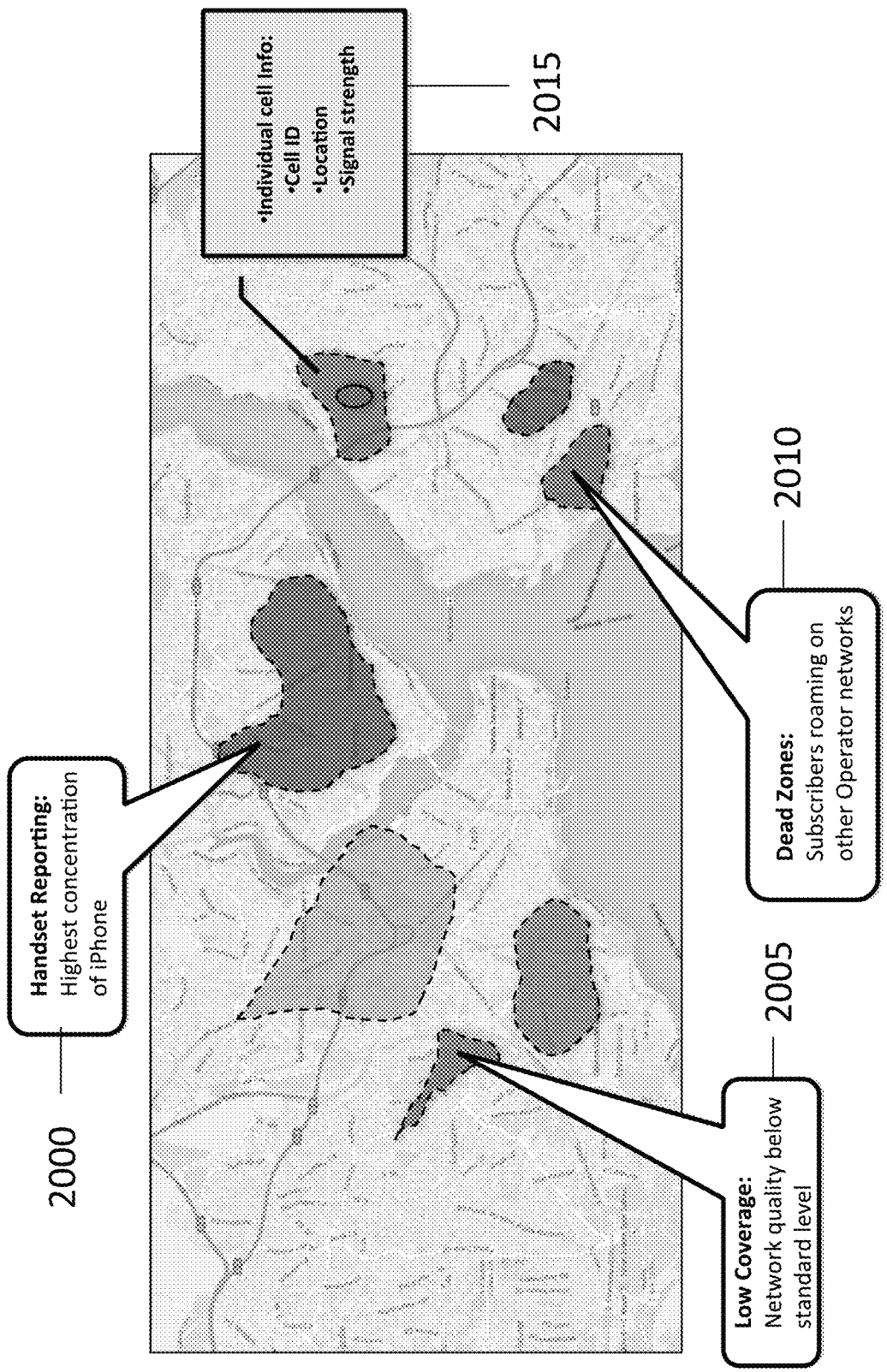
FIG. 2 is an exemplary map illustrating network data collection results showing potential network issues and various trends.

Data Mapping via a User Interface. In some embodiments, the NetMetriX platform includes a web interface that enables administrators to log in and query network measurement results. Results can be automatically mapped, which can display a graphical representation of potential network issues and various trends. A general representation of such a display is shown in FIG. 2.

In some embodiments, the NetMetriX service can be used to generate graphical representations of network data collected. Utilizing the aggregate data from campaign-based data collection methods, after mobile-event data collection, or other forms of data collection, the NetMetriX platform can simply and conveniently summarize that which was gathered, and overlay it on physical representations of location. A few of the ways the data could be summarized are exemplified in the geographical map depicted in FIG. 2.

For example, at 2000, an administrator could use the aggregate data to determine the number of unique mobile subscribers utilizing iPhone devices, and compare it to surrounding cell sites in order to determine the site with the highest concentration of iPhones in a particular network on a given cell site at a particular time of day (i.e., Handset Reporting). This location and time sensitive data would enable the network to optimize its service to iPhones in areas where such devices are more common, and would provide useful data to marketing teams for how to best serve a particular community of mobile device users.

For example, at 2005, an administrator could use the aggregate data to determine where and when network quality falls below the network's standard level (i.e., Low Coverage zones). NetMetriX's ability to offer real-time data on the quality of a network's coverage in graphical representation would enable MNOs to constantly optimize their coverage as necessary, and potentially ascertain patterns of their network quality over time thereby allowing them to improve overall coverage. Specific quality threshold levels can be set and changed by the MNO.

In another example, at 2010, an administrator could use the aggregate data to determine where and when subscribers are roaming on other Operator Networks (i.e., Dead Zones). This data, potentially stored on the devices within the applet until the device is no longer roaming, would, once delivered, provide the MNO with substantial data regarding where and when their subscribers lacked non-roaming service. This would, as in example 2005, allow the Operators to quickly locate and fix unexpected Dead Zones and expand and improve the overall coverage for their subscribers.

In another embodiment, the server can collect information from individual mobile devices such as the cell ID, location, signal strength (including average signal strength, minimum signal strength, and maximum signal strength), time of day, mobile device type, mobile device operating system, and historical trends for each individual device. The server can also collect the number of subscribers measured. For example, an administrator could use some or all or a combination of the data to determine the number of unique mobile subscribers in a particular network on given cell site 2015 at a particular time of day. For example, an administrator could focus on a microsite (a cell site that has a very small radius because it is intended to provide additional coverage in a specific area) that would be critical to gathering data for a specific Mobile Network Operator such as right in front of an MNO store. Through NetMetriX's graphical representation of the data, the MNO would receive data that is easily interpreted into (in some embodiments) the peak points when the largest number of their subscribers pass the store on any given day of the week. This information could be helpful to marketing teams.

Administrators or data users can choose to map any of the collected data points, such handset type, in order to see the distribution of a particular model over a region. For all services, this interface also allows administrators to create a campaign. Within the campaign event, administrators enter relevant information including, but not limited to, the target phone number(s), the timeframe during which a campaign will be relevant, and which network measurement results should be collected.

In some embodiments, maps illustrating data points from mobile devices are created using the cell ID (the ID of the cell tower to which a mobile device is connected). In some embodiments, a geographic area of interest is selected (e.g., a country, state, county, city, zip code, or an area defined by one or more specific cell towers). Next, if specific cell towers do not define the geographic area, then the cell towers in the specified geographic area are mapped. The server can send a communication to mobile devices. The communication comprises a request that the application send back to the server the identity of the cell tower to which it is connected. In some embodiments, one or more additional data points described herein can be requested in the communication. For example, the communication can request the cell ID and the signal strength. Once the data is received, the mobile devices can be added to the map that has been created in a defined geographic area. The signal strength data can inform an MNO about how a specific cell tower is operating.

Operation

The connection to Mobile Operator network can be done in many different ways and the messages can be transported using various methods (e.g., SMS, MMS, USSD, iMessage, e-mails, and/or data communication channels).

Figure 3:
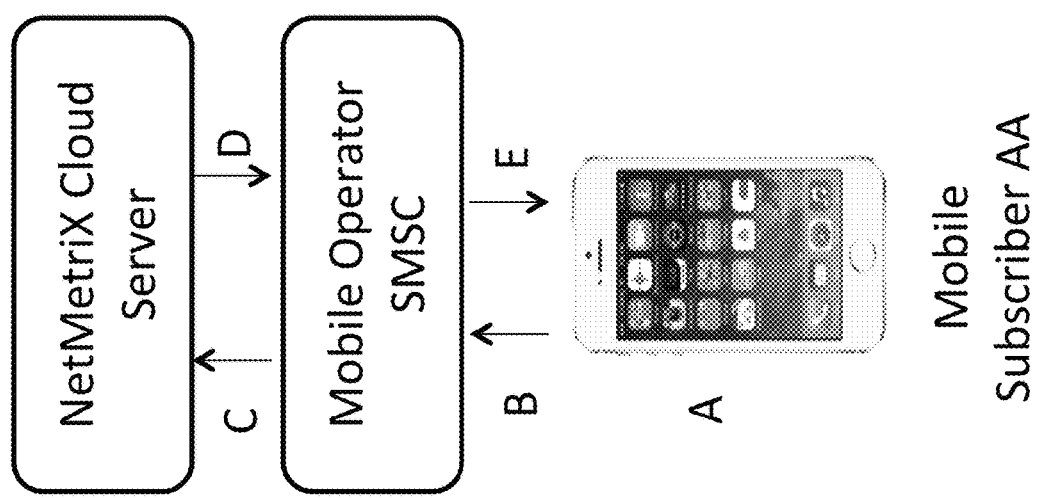
FIG. 3 shows an exemplary SMS/MMS architecture for embodiments disclosed herein.

In one embodiment, as pictured in FIG. 3, SMS and MMS messages can use the following connectivity structure: When Subscriber AA sends a communication comprising a NetMetriX data point back to the server from the mobile device, it can follow this exemplary route:

NetMetriX application within Subscriber AA's mobile device forwards the communication (A) to a designated short code at the Operator's SMSC (B);

SMSC forwards the incoming message to NetMetriX Cloud Server (C);

NetMetriX Cloud Server parses the information and stores for future analysis and data retrieval as desired;

In an embodiment where the NetMetriX cloud server needs to send a follow-up command to the client application upon receiving data or a response from the applet, the proper message and set of instructional commands are created by the server, packaged, and sent to the Operator SMSC (D);

Operator SMSC forwards the message to subscriber AA's mobile device (E);

Subscriber AA's mobile device receives the NetMetriX message and executes actions accordingly.

Figure 4:
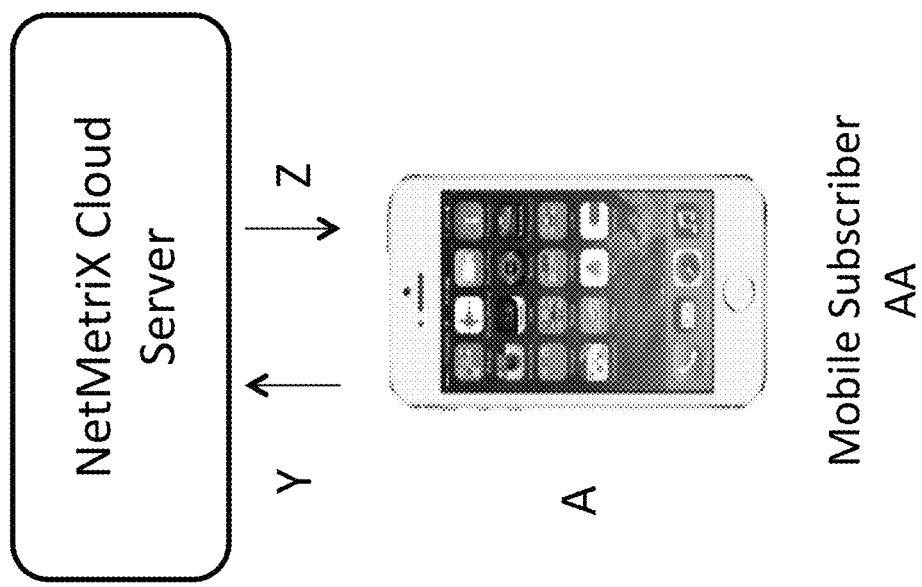
FIG. 4 illustrates an exemplary embodiment for data connectivity.

FIG. 4 illustrates another embodiment for data connectivity as follows:

The NetMetriX application within Subscriber AA's mobile device forwards the message (A) to the NetMetriX Cloud Server (Y);

The NetMetriX Cloud Server receives the message;

The NetMetriX Cloud Server parses and stores the data;

In an embodiment where the NetMetriX cloud server needs to send a follow-up command to the client application upon receiving data or a response from the applet, the proper message and set of instructional commands are created by the server, packaged, and sent back to Mobile Subscriber AA (Z);

Subscriber AA's mobile device receives the NetMetriX message and executes actions accordingly.

In an embodiment where the NetMetriX client application communicates with a server, the application has the server's destination address within its memory. This could be an IP address, a phone number, a short code number that is routed to a hosted SMSC (Short Messaging Service Center) environment, or short code designated by an MNO that routes messages directly to a mobile operator's network (SMSC).

Initialization/Registration

Figure 5:
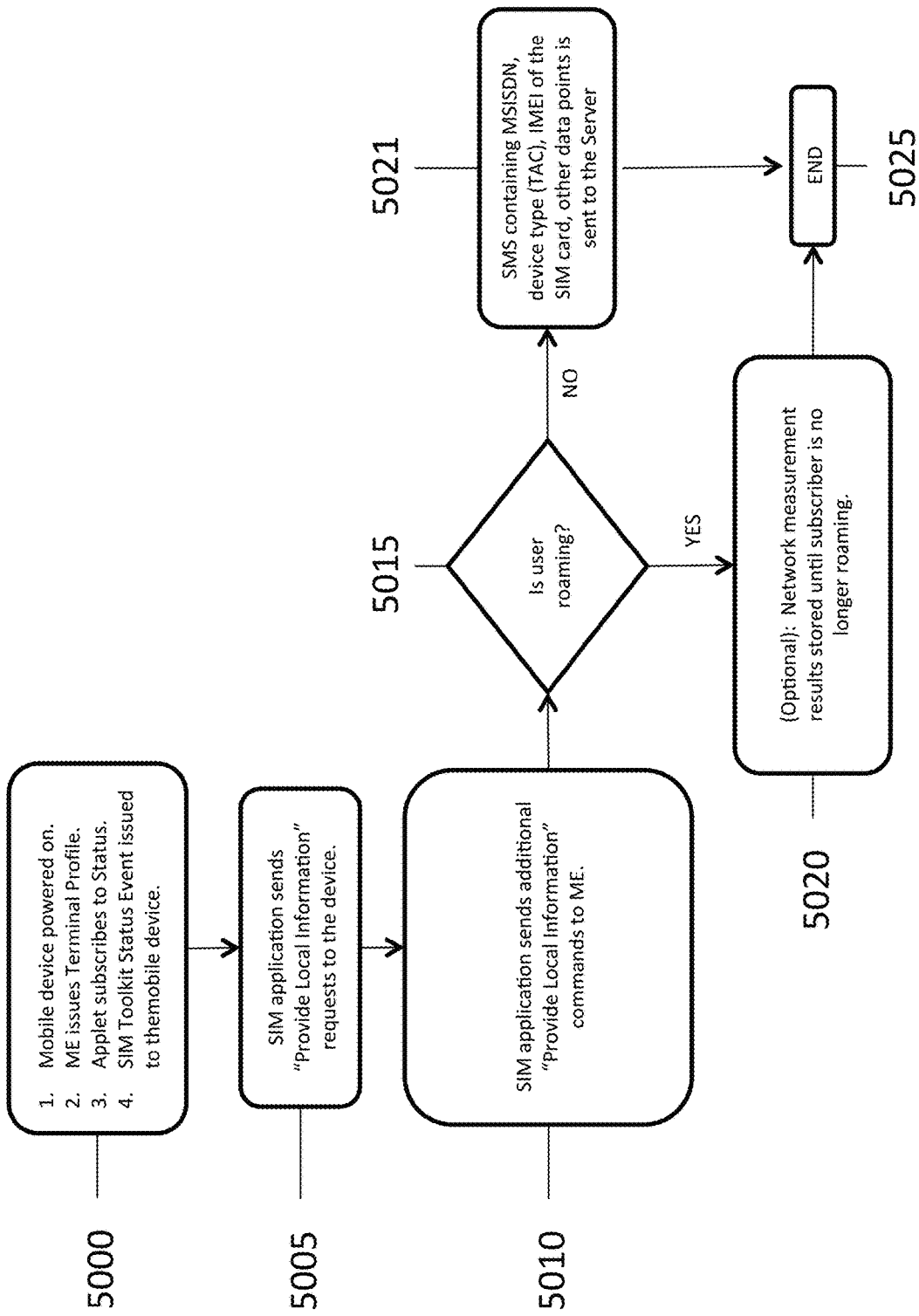
FIG. 5 depicts an embodiment of a provisioning (registration) and initialization process.

FIG. 5 outlines an embodiment of the application provisioning (registration) and initialization process. In one embodiment, when the client application resides on a SIM card, after (1) the device has been powered on by a user, (2) the mobile device issues a Terminal Profile event. Next, (3) The NetMetriX client application subscribes to the SIM Toolkit Status event. Then, (4) The Status Event is issued to the mobile device. These four conditions exemplify stage 5000 of initialization (provisioning) at handset startup. If, at stage 5000, the mobile device responds that it is busy, the SIM Toolkit will issue another Status event in a preset amount of time, which can be set within the application.

When the device is registered to the network and is no longer busy, the NetMetriX application proceeds to stage 5005 in which the SIM application sends a series of Provide Local Information requests to the device including the Mobile Country Code (MCC), Mobile Network Code (MNC), and the International Mobile Equipment Identity (IMEI). In one embodiment, the NetMetriX service can collect network data results upon this initial registration process.

At stage 5010, the NetMetriX application sends additional Provide Local Information commands to the device with different command qualifiers (e.g., location, network measurement results, timing advance) to obtain additional data points. The ICCID of the card is read from EFICCID file.

At stage 5015, the application can also optionally query the device to determine if the subscriber is roaming.

In the embodiment in which the MCC and MNC (Mobile Country Code and Mobile Network Code) indicate a roaming status (stage 5020), the application can optionally not send data automatically to the server. This prevents unnecessary SMS, MMS, or data roaming charges that the subscriber may incur based on his rate package plan. Thus, the network data can be stored and sent to the server when the subscriber is no longer roaming or at the next predefined event.

At stage 5020, storage of the network data ends the initializing (provisioning) at handset startup (stage 5025).

In such an embodiment, the stored network data can be sent to the server as soon as the applet detects that the subscriber is not roaming (as in stage 5021), or after a series of predefined events (such as after a phone call is placed and the subscriber is not roaming).

In the embodiment in which the MCC and the MNC do not indicate a roaming status during the stage 5015 query, stage 5021 proceeds, in which a binary SMS containing all collected data (such as the subscriber's MSISDN, device type (TAC), the IMEI or the SIM card, user preferences and settings (battery usage, language setting), and network data are sent to the server. As outlined above, the message can be sent to a mobile operator's Short Message service center (SMSC) through a designated short code defined for the service. When the message reaches the short code at the SMSC, the SMSC forwards this message to the NetMetriX server.

In an exemplary embodiment, short codes (which are also known as short numbers) can be special telephone numbers, significantly shorter than full telephone numbers, that can be used to address SMS and MMS messages from certain service providers' mobile phones or fixed phones. There are two types of short codes: dialing and messaging. A similar concept for voice calls is known as abbreviated dialing. When the message is received by the server, then the message can be parsed and the data is stored for future graphing and analysis.

In the stage 5021 embodiment, the SMS sent to the server containing MSISDN, device type (TAC), the IMEI of the SIM card, user preferences and settings (battery usage, language setting), and network data ends the process of Initializing (Provisioning) at handset startup (stage 5025).

The above embodiment is exemplary and other configurations are possible. For example, while this application discusses "client," "cloud," and "server" functionality, some of all of this functionality can be combined into a single application (e.g., located on a mobile device, located only in the cloud, and/or only located on a server).

Figure 6:
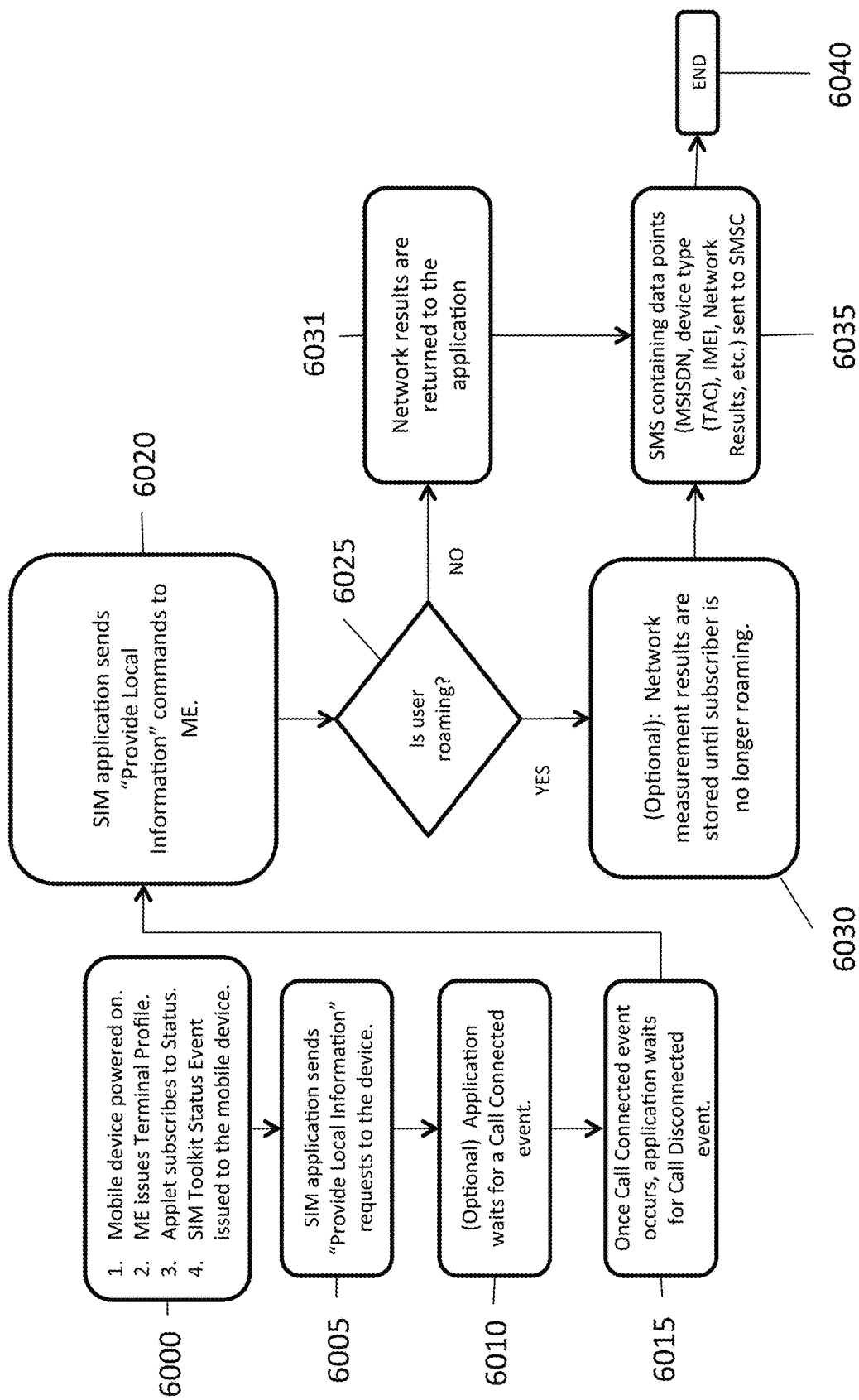
FIG. 6 depicts an embodiment of a provisioning process after a call event.

FIG. 6 depicts an embodiment where the NetMetriX application initializes (provisions) after a phone call event. In certain embodiments, network measurement data is also sent to the server at this time. In this embodiment, the application waits for a call event to occur in order to ensure that the SIM card is actually in a device that can generate a voice communication. There may be scenarios where mobile operators are most interested in collecting data from voice-enabled devices, and not for data-only devices. In either scenario, the NetMetriX application can send a notifier to the server that a particular subscriber and device pairing is one where a voice call is possible. This information can be parsed and stored for further analysis at the server.

In an embodiment represented in FIG. 6, the client application resides on a SIM card. After (1) the mobile device is powered on (2) the mobile device issues a Terminal Profile event. (3) The NetMetriX applet subscribes to the SIM Toolkit Status event. (4) A series of SIM Toolkit events and commands are issued. Stage 6000 of Initialization (Provisioning) exemplifies these conditions. If at stage 6000, the mobile device responds that it is busy, the SIM Toolkit can issue another Status event in a preset amount of time, which can be set by the application.

When the device is registered to the network and the network is no longer busy, the NetMetriX application proceeds to stage 6005 in which the SIM application sends a series of Provide Local Information requests to the device including the Mobile Country Code (MCC), Mobile Network Code (MNC), and the International Mobile Equipment Identity (IMEI). In one embodiment, the NetMetriX service can collect network data results upon this initial registration process.

In an optional embodiment, at stage 6010, the NetMetriX application proceeds to wait for a Call Connected event issued by the SIM Toolkit framework.

In an embodiment that a call connected event occurs, the NetMetriX application proceeds to stage 6015, in which the application waits for a Call Disconnected event.

In an embodiment where a call disconnected event occurs, the NetMetriX application proceeds to stage 6020 in which the SIM Toolkit Framework sends "Provide Local Information" commands to the device. Different command qualifiers are used to obtain all data points (location, network measurement results, timing advance, etc.). In an embodiment, this can include notifying the NetMetriX client application when the Call Connected and Call Disconnected events occur. The ICCID of the card is read from EFICCID file.

In stage 6025, the NetMetriX application can also query the device via the SIM to determine if the subscriber is roaming.

In an embodiment in which the MCC and MNC (Mobile Country Code and Mobile Network Code) indicate a roaming status (stage 6030), the application can optionally store the network measurement (from stages 6020) results until the subscriber is no longer roaming (and not send the data automatically to the server). This prevents unnecessary SMS, MMS, or data roaming charges that the subscriber may incur based on his rate package plan. Thus, the stored network data can be sent to the server when the subscriber is no longer roaming.

In this embodiment, once the subscriber is no longer roaming, an SMS containing the MSISDN, device type (TAC), IMEI of the SIM card, Network Results, and other data points is sent to the SMSC, exemplified by stage 6035. The resulting data sent back to the server is stored for further analysis and data parsing, and could, optionally be represented graphically as in FIG. 2.

In an embodiment in which the MCC and the MNC do not indicate a roaming status (stage 6031), the network results from stage 6020 are returned to the application.

In this embodiment, once the network results are returned to the application, an SMS containing the MSISDN, device type (TAC), IMEI of the SIM card, Network Results, and other data points is sent to the SMSC (exemplified by stage 6035). The resulting data sent back to the server is stored for further analysis and data parsing, and could, optionally be represented graphically as in FIG. 2.

The SMS sent to the SMSC (stage 6035) ends the process of Initializing (Provisioning) (stage 6040).

While the description above discusses the NetMetriX application receiving certain call connect and disconnect events, the application does not need to receive the actual event itself. For example, in some embodiments, the mobile device operating system can receive the call events, and rename/repackage the event before providing it to the application.

Campaign-Based Data Collection

Figure 7:
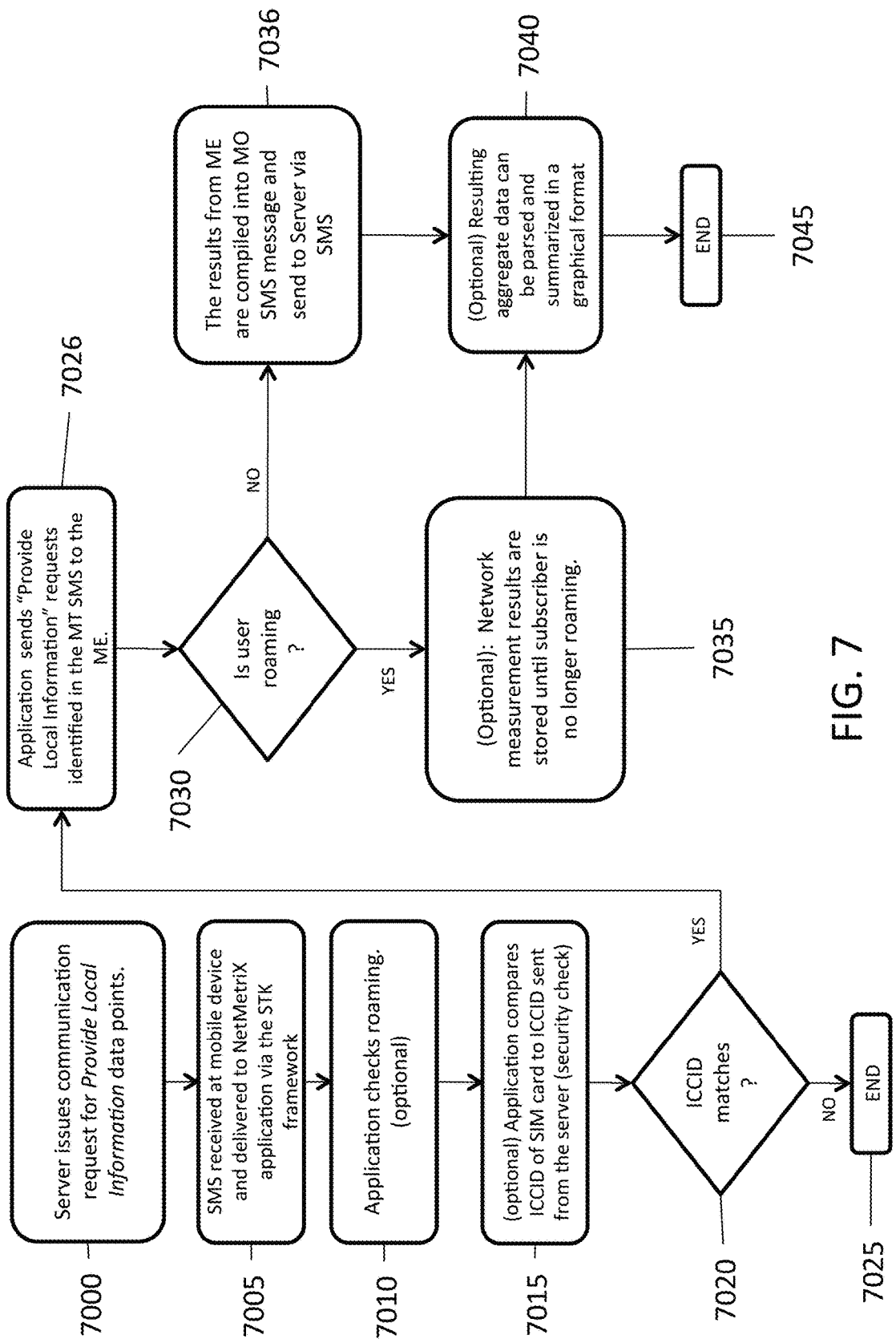
FIG. 7 depicts an embodiment of a campaign-based data collection process.

FIG. 7 depicts an embodiment of a type of data collection process. In this embodiment, a large number of subscribers can be targeted at once. The server queries specific subscribers and requests that network data be returned under a set of predefined conditions.

In one embodiment outlined above where the NetMetriX client resides on a SIM card, stage 7000 exemplifies when the server issues a class 2 formatted binary SMS to request various Provide Local Information data points. In some embodiments, the data points are defined within the request.

In stage 7005, the SMS is received at the mobile device, passed to the SIM card, and forwarded to the NetMetriX application via the SIM Toolkit (STK) Framework.

In an optional embodiment, exemplified by stage 7010, the NetMetriX application can proceed to check if the device is currently roaming via the MCC (Mobile Country Code) and MNC (Mobile Network Code).

In an optional embodiment, exemplified by stage 7015, the NetMetriX application can check if the ICCID in the incoming binary SMS message matches the ICCID of the SIM card in the device. This is an added security measure.

In an embodiment exemplified by stage 7020, the NetMetriX application compares the ICCID of the incoming binary SMS message to the ICCID of the SIM card in the device. This is a security feature.

In the embodiment that the ICCID of the binary SMS message does not match the ICCID of the SIM card in the device, typified by stage 7025, the campaign based data collection process ends. The ICCID check can be configured within the system as an optional check. In the instance where an administrator determines that the ICCID match is not required, the process flow is able to continue to stage 7026.

In the embodiment where the ICCID of the binary SMS message matches the ICCID of the SIM card in the device, typified by stage 7026, then the NetMetriX applet continues with is Provide Local Information requests identified in the MT SMS to the device. These requests could include location, network measurement results, timing advance, etc.

In an optional embodiment shown by stage 7030, the NetMetriX application proceeds to query the device via the SIM to determine if the subscriber is roaming.

In the embodiment in which the MNC and MCC indicate that the device user is roaming in the stage 7030 query, the network measurements are stored until any of the following three events occurs, exemplifying stage 7035: 1) the subscriber is no longer roaming, 2) after the next predefined event, or 3) after the application presents itself to the user and requests permission to send the data to the server. With one of the three aforementioned requirements met, the results are compiled in a Mobile Originated (MO) SMS and sent back to the server as either a regular text message or as a binary SMS.

In an optional embodiment, exemplified by stage 7040, the network results contained in the stage 7035 SMS can be aggregated and summarized in a graphical format (as in FIG. 2) to provide practical data for the network.

In some embodiments, the SMS sent to the server (stage 7035) or graphical summary of network results (stage 7040) ends the process of Campaign Based Data Collection (stage 7045).

In the embodiment in which the MNC and MCC indicate that the device user is not roaming in the stage 7030 query, the network measurements are compiled into an Mobile Originated (MO) SMS message and sent to the server as either a regular text message or a binary SMS, as exemplified by stage 7036.

In an optional embodiment, exemplified by stage 7040, the network results contained in the stage 7036 SMS can be aggregated and summarized in a graphical format (as in FIG. 2) to provide practical data for the MNO.

The SMS sent to the server (stage 7036) or graphical summary of network results (stage 7040) ends the process of Campaign Based Data Collection (stage 7045).

In some embodiments, the application can also present itself to the user and request permission to send data to the server, prior to sending any data.

Figure 10:
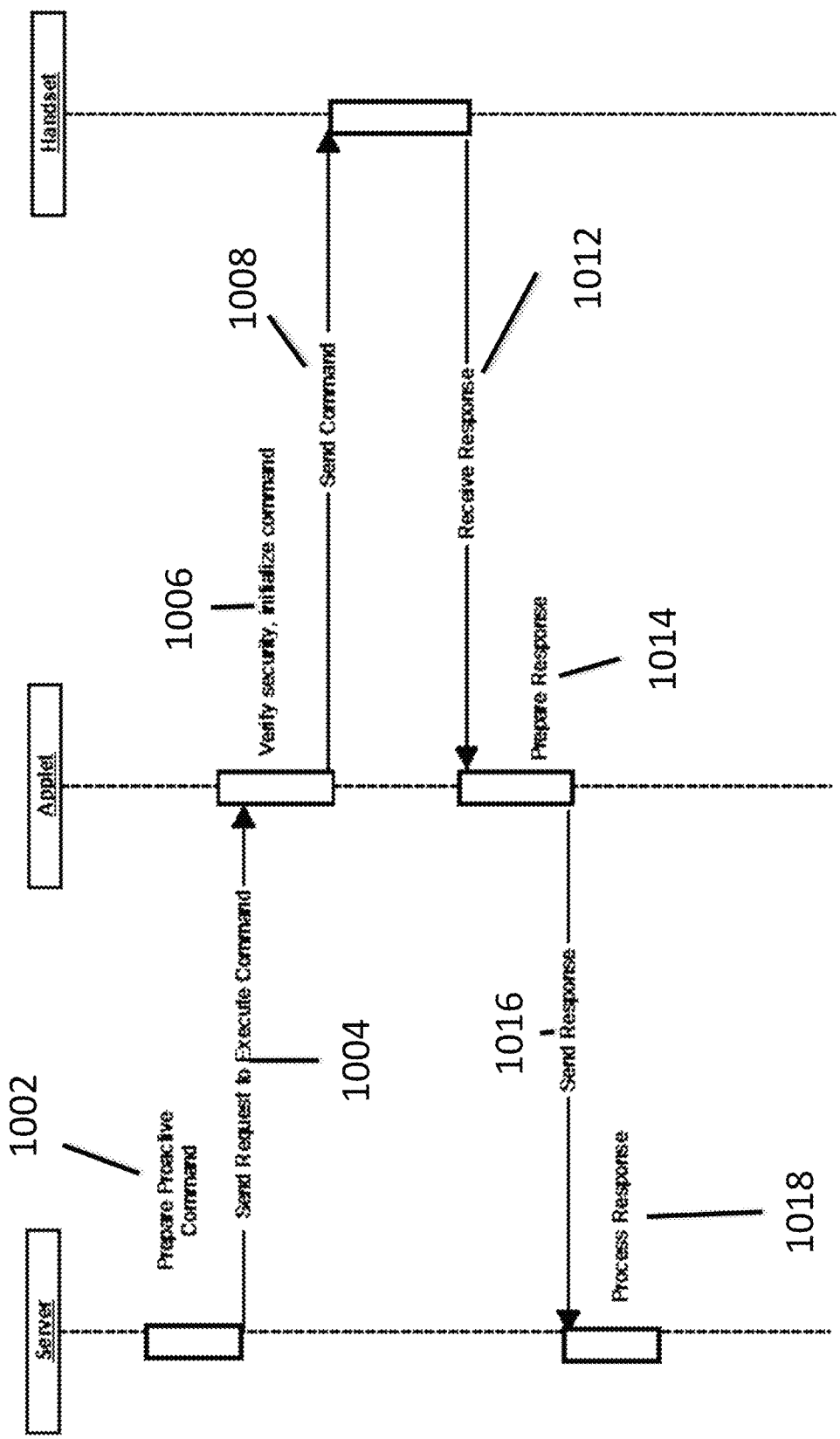
FIG. 10 depicts a flowchart illustrating an embodiment of methods disclosed herein.

FIG. 10 further exemplifies a campaign-based data collection approach. At stage 1002, the server prepares a communication comprising Proactive Command. Next, at stage 1004, the communication comprising the request is sent to the application on the mobile device. At stage 1006, the applet can optionally verify security. Also at stage 1006, the applet can initialize a command. At stage 1008, the applet sends the command to the handset. The handset then sends the response with the relevant information back to the applet at stage 1012. At stage 1014, the applet prepares the response to be sent back to the server. At stage 1016, the applet sends the response to the server. At stage 1018, the server processes the response received from the applet on the mobile device.

After Call Event Data Collection

Figure 8:
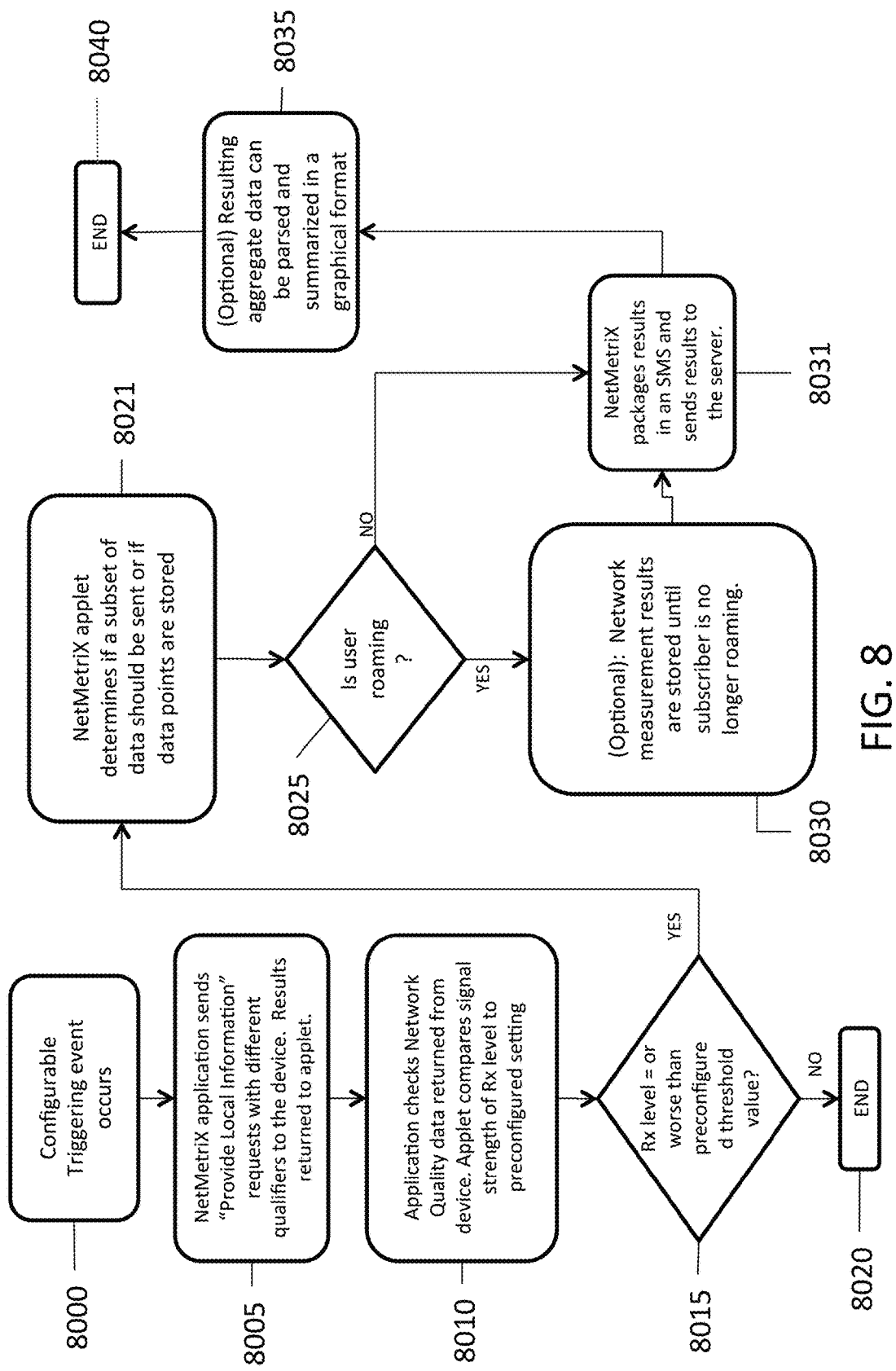
FIG. 8 depicts an embodiment of event-based data collection approach.

FIG. 8 depicts an embodiment of an event-based data collection approach, such as after a dropped call or after a call where the signal strength is below a predefined threshold value. In some embodiments, a configurable triggering event occurs at stage 8000. This event can be defined at the server level and sent to the client application. In one example, a Call Disconnected event occurs, and the NetMetriX client is notified of the event via the SIM Toolkit Framework. In some embodiments, the configurable trigger event is a dropped call, the conclusion of a phone call, or when the network or call quality falls below a predefined threshold value or fails to meet predefined network quality criteria. In some embodiments, the cause of call disconnected event triggers the data point collection. In some such embodiments, the cause of call disconnected can be the data point collected (e.g., "switching equipment congestion," "temporary failure," "pre-emption," or another cause described in the TS 04.08 standard).

The NetMetriX application proceeds to stage 8005, in which it sends "Provide Local Information" requests with different qualifiers (e.g., location, Network Measurement Results, Timing Advance, etc.) to the device after the phone call. Network results are returned to the application.

In an embodiment exemplified by stage 8010, the application can then check the network quality data returned from the device (e.g., Rx level of serving cell and sub-serving cell as one example) and compare the results to preconfigured threshold values (exemplified in stage 8015). The threshold values are stored in the client application can be changed or updated at any time via communications with the cloud server.

If the network results are superior to the preconfigured threshold Rx values, then the After Call Event Data Collection process ends, exemplified by stage 8020.

If the network results match or are worse than the configured threshold/trigger values, then the data can either be stored in the client for future retrieval or can be automatically sent to the server, as exemplified by stage 8021.

To determine what should be done with the aforementioned data in stage 8021, at stage 8025 the NetMetriX application can query the device via the SIM to determine if the subscriber is roaming.

In the embodiment in which the Mobile Country Code (MCC) and Mobile Network Code (MNC) indicate a roaming status (stage 8030), the application can optionally store the network measurement (from stages 8005 and 8010) results until the subscriber is no longer roaming (and not send the data automatically to the server). This prevents unnecessary SMS, MMS, or data roaming charges that the subscriber may incur based on his rate package plan. Thus, the stored network data can be sent to the server when the subscriber is no longer roaming, or after the next predefined event.

In an embodiment, exemplified by stage 8031, once the subscriber is no longer roaming, or after the next predefined event, an SMS containing the data results is sent to the server.

In the embodiment in which the MCC and the MNC do not indicate a roaming status (stage 8031), the network results from stage 8005 and 8010 are packaged into an SMS and sent to the Short Message Service Center (SMSC).

In an optional embodiment, exemplified by stage 8035, the network results contained in the stage 8031 SMS can be aggregated and summarized in a graphical format (as in FIG. 2) to provide practical data for the network.

The SMS sent to the server (stage 8031) or graphical summary of network results (stage 8035) ends the process of After Call Event Data Collection (stage 8040).

In some embodiments, the NetMetriX application can differentiate between Mobile Equipment Originated events and Network Originated events. For example, if a call from Caller A to Caller B is connected, Caller A receives the corresponding Call Connected event from the network, rather than having it originate from Caller A's device itself. Thus, by differentiating between Mobile Equipment Originated events and Network Originated events, the NetMetriX application can determine whether the call is an incoming call or an outgoing call. In systems that support Network Originated Call Control events, the NetMetriX application can also differentiate between incoming and outgoing calls by determining whether the Call Control event was Mobile Equipment Originated or Network Originated. The application can also differentiate between incoming and outgoing calls other ways as well. The call type (incoming or outgoing) can be sent to and stored at the server.

Financial Transaction Verification

Figure 9:
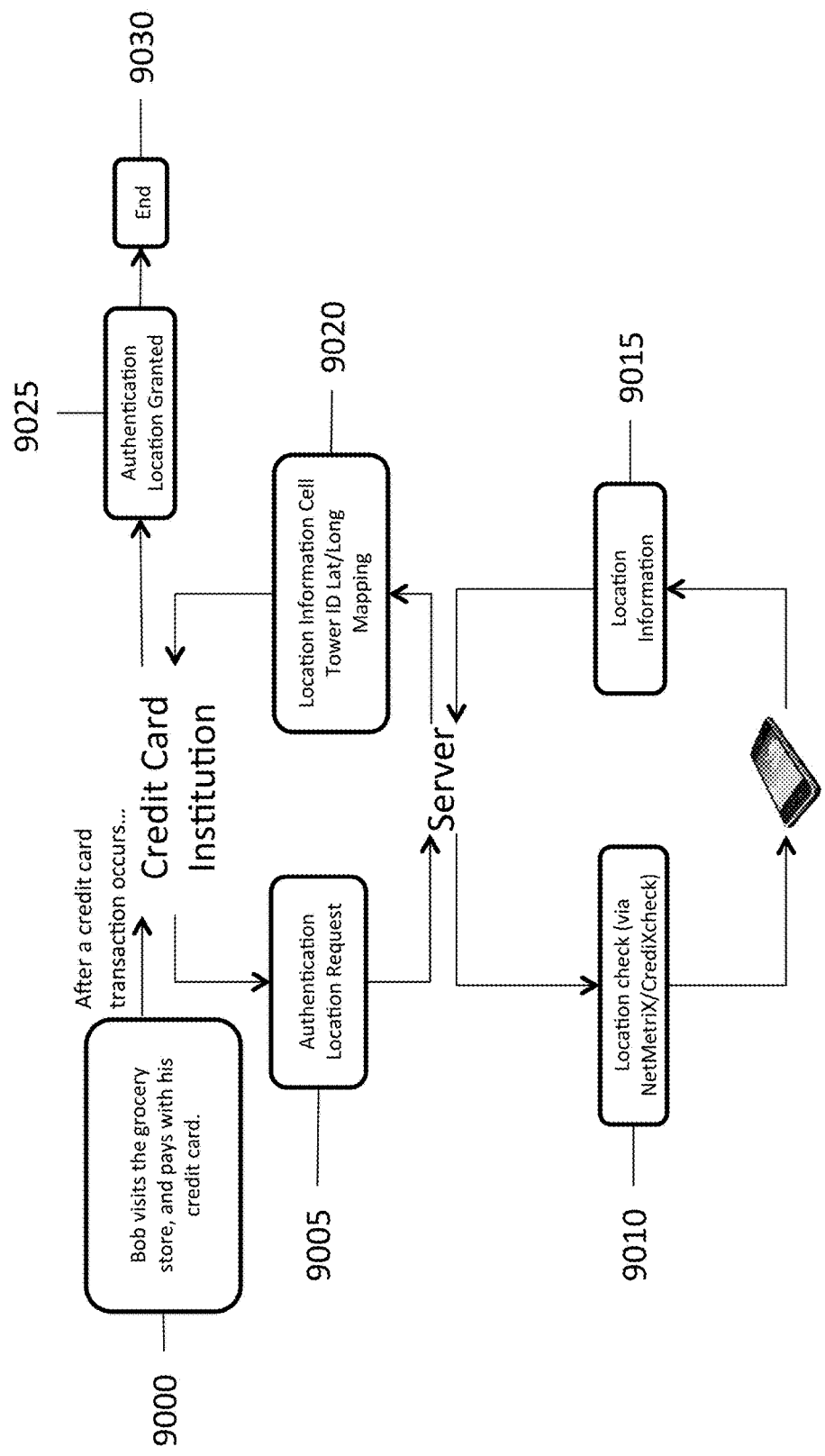
FIG. 9 depicts an embodiment of a location based-check via a mobile subscription to validate a financial transaction.

FIG. 9 depicts an embodiment, described here as the CrediXcheck process, where the NetMetriX service can be used to enable a location based check via a mobile subscription to validate a financial transaction, e.g., a credit or debit card transaction, or other payment transaction.

In one embodiment, at stage 9000, Bob visits the grocery store and pays with his credit card.

When the credit card transaction occurs, the credit card institution sends an authentication location request (stage 9005) to the NetMetriX platform. This could be sent via a web service or automatically via an application programming interface (API).

Subsequently, the authentication location request triggers the NetMetriX platform to send a location request to the mobile device linked to the credit card account (stage 9010).

In an embodiment exemplified by stage 9015, the mobile device returns to NetMetriX the location information (via SMS message, as in FIG. 8, stage 8031) of the individual's mobile device that is linked to the credit card.

At stage 9020, the NetMetriX platform utilizes the location information to return the location of the mobile device to the credit card institution. In some embodiments, the location information includes the cell tower ID and/or the latitude/longitude. If the location of the credit card transaction matches the location of the mobile device linked to the credit card account, location authentication of the transaction is granted (stage 9025). In some embodiments, the authentication step of comparing the location of the mobile device to the location of the credit card transaction can be performed as part of the process. In other embodiments, the credit card institution can compare the location information and determine whether to verify the transaction. The granting of the authentication location ends the process of CrediXcheck (a location-based check via a mobile subscription to validate a credit card transaction), as exemplified by stage 9030.

The invention claimed is:

1. An automated computer-implemented method of verifying a credit card transaction, the credit card being associated with a mobile device, the method comprising,
    receiving, at a server, a verification request comprising information identifying the mobile device and information about a location of the credit card transaction, wherein the verification request is received at the server from a credit card institution or the entity associated with a credit card institution;
    sending, from the server to the mobile device, a first communication comprising a location command requesting the mobile device to send location information of the mobile device to the server;
    receiving, at the server from the mobile device, a second communication comprising the location information of the mobile device;
    determining the location of the mobile device based upon the location information of the mobile device;
    comparing the location of the credit card transaction to the location of the mobile device, and
    sending from the server to the credit card institution or the entity associated with a credit card institution, a third communication comprising information that the location of the credit card transaction and the location of the mobile device match, thereby verifying the transaction.

2. The method of claim 1, wherein the location information of the mobile device comprises a cell ID.

3. The method of claim 2, wherein determining the location of the mobile device comprises correlating or converting the cell ID to a geographic location.

4. The method of claim 3, wherein the geographic location comprises a street address, city block, zip code, neighborhood, city, county, latitude and longitude, or state.

5. The method of claim 2, wherein the location command is configured to be processed by an application installed on the mobile device.

6. The method of claim 2, wherein the first communication comprising a location command is not displayed on a screen of the mobile device.

7. An automated computer-implemented method of verifying a credit card transaction, the credit card being associated with a mobile device, the method comprising,
    receiving, at a server, a verification request comprising information identifying the mobile device and information about a location of the credit card transaction, wherein the verification request is received at the server from a credit card institution or the entity associated with a credit card institution;
    sending, from the server to the mobile device, a first communication comprising a location command requesting the mobile device to send location information of the mobile device to the server;
    receiving, at the server from the mobile device, a second communication comprising the location information of the mobile device;
    determining the location of the mobile device based upon the location information of the mobile device;
    comparing the location of the credit card transaction to the location of the mobile device; and sending from the server to the credit card institution or the entity associated with a credit card institution, a third communication comprising information that the location of the credit card transaction and the location of the mobile device match do not match.

* * * * *